(12) United States Patent
Ronen et al.

(10) Patent No.: US 11,182,441 B2
(45) Date of Patent: Nov. 23, 2021

(54) HYPOTHESES GENERATION USING SEARCHABLE UNSTRUCTURED DATA CORPUS

(71) Applicant: SparkBeyond LTD, Natanya (IL)

(72) Inventors: Amir Ronen, Haifa (IL); Avishay Livne, Kiryat Tiv'on (IL); Meir Maor, Netanya (IL); Ron Karidi, Herzliya (IL); Sagie Davidovich, Zicron Yaakov (IL)

(73) Assignee: SPARKBEYOND LTD, Natanya (IL)

(*) Notice: Subject to any disclaimer, the term of this patent is extended or adjusted under 35 U.S.C. 154(b) by 555 days.

(21) Appl. No.: 15/856,782

(22) Filed: Dec. 28, 2017

(65) Prior Publication Data

US 2019/0205470 A1 Jul. 4, 2019

(51) Int. Cl.
*G06F 16/28* (2019.01)
*G06F 16/951* (2019.01)
*G06F 16/33* (2019.01)
*G06F 16/9535* (2019.01)

(52) U.S. Cl.
CPC .......... *G06F 16/951* (2019.01); *G06F 16/285* (2019.01); *G06F 16/3331* (2019.01); *G06F 16/9535* (2019.01)

(58) Field of Classification Search
CPC ............. G06F 16/258; G06F 16/313; G06F 16/24573; G06F 16/904; G06F 16/951; G06F 16/9536; G06F 16/285; G06F 16/3331; G06F 16/9535
See application file for complete search history.

(56) References Cited

U.S. PATENT DOCUMENTS

| | | | |
|---|---|---|---|
| 2009/0164416 A1* | 6/2009 | Guha | G06F 16/31 |
| 2010/0228693 A1* | 9/2010 | Dawson | G06F 16/322 |
| | | | 707/728 |
| 2018/0144269 A1* | 5/2018 | Wilson | G06N 5/022 |
| 2018/0197128 A1* | 7/2018 | Carstens | G06F 16/288 |

* cited by examiner

*Primary Examiner* — Marcin R Filipczyk
(74) *Attorney, Agent, or Firm* — Myers Wolin, LLC

(57) ABSTRACT

Methods, products and apparatus are provided for hypotheses generation using searchable unstructured data corpus. In one method, a query is generated based on at least one attribute of at least one instance in a dataset. The query is provided to a search engine searching in an unstructured data corpus. An hypothesis for the database is based on a new attribute whose value is defined based on the one or more results. Another method comprises obtaining a set of keywords from a plurality of hypotheses extracted from a database. A query is generated based on an attribute of an instance in the dataset, where the attribute corresponds to an hypothesis. A search engine executes the query to provide results which are used to augment an instance with a new attribute, where a value of the new attribute is computed based on the one or more results.

16 Claims, 5 Drawing Sheets

HYPOTHESES GENERATION USING SEARCHABLE UNSTRUCTURED DATA CORPUS

TECHNICAL FIELD

The present disclosure relates to machine learning and big data analysis in general, and to utilization of data corpus of unstructured data, in particular.

BACKGROUND

Machine learning and big data analysis, hereinbelow for simplicity machine learning, attempt to extract information from a dataset and provide prediction on new datasets or insights therefrom. However, the effectiveness of the prediction model built based on a dataset and of the insights that can be derived from a dataset are greatly influenced by the features that are generated from the data and are analyzed.

In order to operate successfully, machine learning systems need data. In particular, many examples of different entities may be desired, such as a significant number of examples of entities exhibiting each label. Increased number of relevant properties' of each entity is also useful, as it facilities to identify and utilize the properties which correlate with each label. As an example, knowing a company's revenue or location would probably help in predicting its next year revenue.

The World Wide Web (WWW) is arguably the largest body of knowledge created by humans, thus it is in theory an excellent source of data that could be used by machine learning pipelines. However it is unstructured and messy which prohibits machines from easily exploiting it. Typically, a human would use a web search engine in order to do research and potentially to manually attach useful nuggets of knowledge to a machine learning pipeline. This however is a difficult task for computers to perform, and computers are currently unable to automatically utilize this large body of knowledge.

BRIEF SUMMARY

One exemplary embodiment of the disclosed subject matter is a computer program product comprising a non-transitory computer readable storage medium retaining program instructions, which program instructions when read by a processor, cause the processor to perform a method comprising: obtaining a dataset, wherein each instance in the dataset comprising one or more attributes; generating a query based on at least one attribute of at least one instance in the dataset; providing the query to a search engine, wherein the search engine is configured to provide one or more results from an unstructured data corpus that match the query; obtaining the one or more results; determining a hypothesis for the dataset, wherein the hypothesis is based on a new attribute whose value is defined based on the one or more results; and outputting an output, wherein the output is based on the hypothesis.

Optionally, said generating comprises generating a query based on a single instance, whereby auxiliary unstructured data relating to an entity represented by the single instance is obtained and used for determining a value of the new attribute for the instance.

Optionally, the hypothesis is that the one or more results comprise at least one result that comprises a term, wherein the new attribute is indicative of an existence of a result that comprises the term.

Optionally, said generating comprises generating a query based on a plurality of instances, whereby auxiliary unstructured data relating to a plurality of entities represented by the plurality of instances is obtained and used for determining a value for the new attribute for the plurality of instances.

Optionally, the hypothesis is an inclusion of an entity identifier of an instance within a document in the auxiliary unstructured data is indicative of the instance having a property, wherein the new attribute is indicative whether the entity identifier of an instance is included within a document in the auxiliary unstructured data.

Optionally, the dataset is a labeled dataset, wherein the plurality of instances are instances sharing a same label, whereby the auxiliary unstructured data is potentially indicative of features relating to the same label.

Optionally, the dataset is a labeled dataset, wherein said determining the hypothesis comprises: determining one or more potential hypotheses, wherein each of the one or more potential hypotheses is based on a different new attribute whose value is based on at least a portion of the unstructured data corpus; and for each of the potential hypotheses, validating or refuting the potential hypothesis based on the labeled dataset, whereby determining the hypothesis by identifying a potential hypothesis that is validated.

Optionally, the dataset is a labeled dataset, wherein said method further comprises: encoding features for the labeled instances of the labeled dataset, wherein the encoded features comprise at least one feature encoded based on the new attribute; training a predictive model using the encoded features of the labeled dataset; obtaining an unlabeled instance; encoding features for the unlabeled instance, wherein the encoded features comprise the at least one feature encoded based on the new attribute; and applying the predictive model on the encoded features of the unlabeled instance to predict a label thereof.

Optionally, said encoding features for the unlabeled instance comprises: generating a second query based on the unlabeled instance; providing the second query to the search engine; obtaining from the search engine, at least one result that matches the second query; and determining a value for the new attribute for the unlabeled instance, based on the at least one result.

Optionally, said encoding features for the unlabeled instance comprises: determining a value for the new attribute for the unlabeled instance based on the one or more results of the query, whereby said encoding for the unlabeled instance is performed without an invocation of the search engine.

Optionally, said generating comprises generating a query based on an entity identifier of at least one instance in the dataset, wherein the entity identifier is extracted, at least partially, from the at least one instance.

Optionally, said generating the query comprises concatenating a type restrictor, wherein the type restrictor is a search engine operator configured to limit a type of unstructured data which can match the query.

Optionally, said generating the query comprises concatenating a domain restrictor, wherein the domain restrictor is a search engine operator configured to limit a domain from which results of the query are obtained.

Optionally, said obtaining the one or more results comprises obtaining, from the search engine, a results page comprising one or more lists of links to the one or more results; and traversing the links of the one or more lists of links to obtain the one or more results.

Another exemplary embodiment of the disclosed subject matter is a computer program product comprising a non-transitory computer readable storage medium retaining program instructions, which program instructions when read by a processor, cause the processor to perform a method comprising: obtaining a dataset, wherein each instance in the dataset comprising one or more attributes; obtaining from the dataset, a plurality of hypotheses; obtaining a set of keywords from the plurality of hypotheses; generating a query based on at least one attribute of at least one instance in the dataset, wherein the at least one attribute corresponds to at least one hypothesis; providing the query to a search engine, wherein the search engine is configured to provide one or more results from an unstructured data corpus that match the query; obtaining the one or more results; and augmenting at least one instance with a new attribute, wherein a value of the new attribute is computed based on the one or more results.

Optionally, each hypothesis of the plurality of hypotheses is indicative that an instance or portion thereof comprises an element; wherein each keyword in the set of keywords is an element of the plurality of hypotheses; and wherein said augmenting comprises: identifying an alternative element to the set of keywords; and wherein the new attribute is indicative that the instance or portion thereof comprises the alternative element.

Yet another exemplary embodiment of the disclosed subject matter is a method comprising: obtaining a dataset, wherein each instance in the dataset comprising one or more attributes; generating a query based on at least one attribute of at least one instance in the dataset; providing the query to a search engine, wherein the search engine is configured to provide one or more results from an unstructured data corpus that match the query; obtaining the one or more results; determining a hypothesis for the dataset, wherein the hypothesis is based on a new attribute whose value is defined based on the one or more results; and outputting an output, wherein the output is based on the hypothesis.

Optionally, said generating comprises generating a query based on a single instance, whereby auxiliary unstructured data relating to an entity represented by the single instance is obtained and used for determining a value of the new attribute for the instance.

Optionally, the hypothesis is that the one or more results comprise at least one result that comprises a term, wherein the new attribute is indicative of an existence of a result that comprises the term.

Optionally, said generating comprises generating a query based on a plurality of instances, whereby auxiliary unstructured data relating to a plurality of entities represented by the plurality of instances is obtained and used for determining a value for the new attribute for the plurality of instances.

Optionally, the hypothesis is an inclusion of an entity identifier of an instance within a document in the auxiliary unstructured data is indicative of the instance having a property, wherein the new attribute is indicative whether the entity identifier of an instance is included in the auxiliary unstructured data.

Optionally, the dataset is a labeled dataset, wherein the plurality of instances are instances sharing a same label, whereby the auxiliary unstructured data is potentially indicative of features relating to the same label.

Optionally, the dataset is a labeled dataset, wherein said method further comprises: encoding features for the labeled instances of the labeled dataset, wherein the encoded features comprise at least one feature encoded based on the new attribute; training a predictive model using the encoded features of the labeled dataset; obtaining an unlabeled instance; encoding features for the unlabeled instance, wherein the encoded features comprise the at least one feature encoded based on the new attribute, wherein said encoding features for the unlabeled instance comprises: generating a second query based on the unlabeled instance; providing the second query to the search engine; obtaining from the search engine, at least one result that matches the second query; and determining a value for the new attribute for the unlabeled instance, based on the at least one result; and applying the predictive model on the encoded features of the unlabeled instance to predict a label thereof.

Optionally, the dataset is a labeled dataset, wherein said method further comprises: encoding features for the labeled instances of the labeled dataset, wherein the encoded features comprise at least one feature encoded based on the new attribute; training a predictive model using the encoded features of the labeled dataset; obtaining an unlabeled instance; determining a value for the new attribute for the unlabeled instance based on the one or more results of the query, whereby determining the value for the new attribute for the unlabeled instance without an invocation of the search engine and based on search result of the query which was performed a-priori; and applying the predictive model on the encoded features of the unlabeled instance to predict a label thereof Yet another exemplary embodiment of the disclosed subject matter is an apparatus comprising a processor and a memory, wherein the memory retaining a computer program product retaining instructions causing the processor to perform any method in accordance with the disclosed subject matter.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
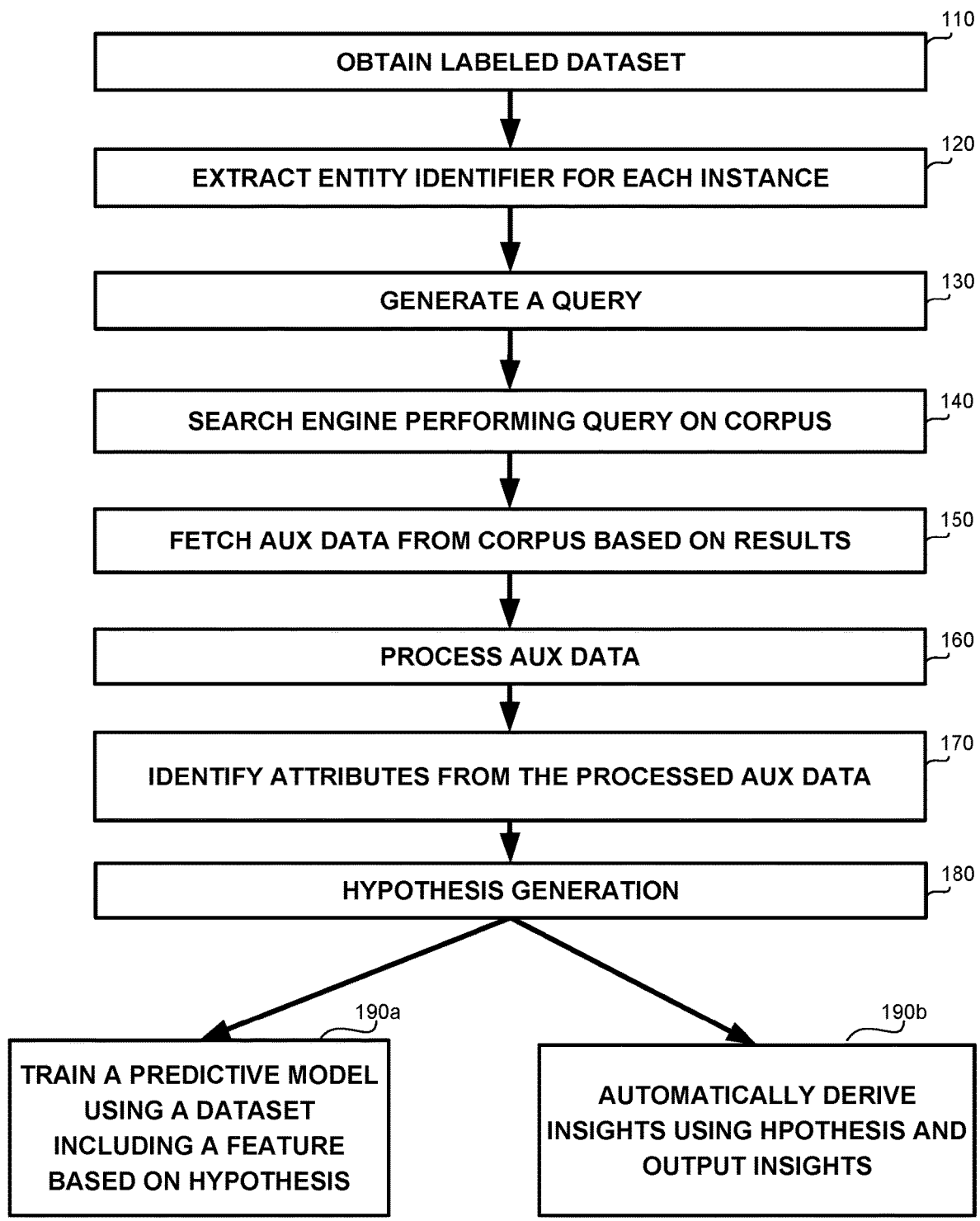
FIGS. 1A-1C show flowchart diagrams of methods, in accordance with some exemplary embodiments of the disclosed subject matter.

One technical problem dealt with by the disclosed subject matter is to utilize unstructured data corpus, such as available on the WWW, or accessible via a search engine, for machine learning and for big data analysis. In some cases, it may be desired to automatically generate and validate a hypothesis regarding an instance in a dataset using additional information obtained from the unstructured data corpus. Utilizing the unstructured data corpus may enable use of significantly less explicit data, and still having sufficient amount of relevant properties that are obtained indirectly from the unstructured data corpus.

In some exemplary embodiments, a dataset may comprise of entities. Each entity (e.g., a record, a row, a combination of rows from different tables, or the like) may be comprised of attributes (e.g., fields or columns). Attributes may comprise values of different types, such as but not limited to numeric value, categorical value, Boolean value, textual value, vector, time series, coordinates (e.g., latitude and longitude), or the like.

Throughout the specification, two main examples are used for the sake of clarity. The first example is predicting whether a Titanic passenger survived or not given the passenger's name. The second example is predicting for a company which industry it operates in, based on its name only. These examples are not meant to limit the disclosed subject matter.

One technical solution may be to automatically generate hypothesis that is based on an auxiliary dataset which comprises unstructured data. In accordance with the disclosed subject matter, the hypothesis generation may be performed automatically by a computer. The hypothesis may be indicative of a label to be assigned to the instance, and therefore may be useful in classification and label prediction. In some cases, the hypothesis may be used to define one or more new features in a machine learning model. Additionally or alternatively, the hypothesis may be used as a basis for an insight about an entity, even if the label is known. For example, a hypothesis as to whether a client will churn or not churn may be useful to understand the motivations of clients and allow an organization to improve its operation to reduce churn.

Hypothesis generation may comprise, for each labeled instance in a labeled dataset, generating attributes based on search results in an unstructured data corpus obtained with respect to a query. Value for potential attributes may be automatically computed based on the search results. The potential attributes may be filtered based on a statistical metric, such as whether the value of the attribute is indicative in a statistical significant manner, to the label. Potential attributes that pass such filtering process may be added to the labeled instances, thereby improving the labeled instances using information from unstructured data corpus. In particular, an auxiliary data may be obtained and used to define attributes, such as based on the relationship between a record and the auxiliary data. For example, the auxiliary data may be used as a lookup table to define a value of a potential attribute, such as a value of a Boolean attribute "entity appears in auxiliary data?". A hypothesis may be based on the value of the potential feature, such as the label of an instance of a passenger is Survived, when the value of the Boolean feature "name of entity appears in a list of survivors of the Titanic, which was found online".

Another technical solution dealt by the disclosed subject matter comprises obtaining an instance, generating a query based on the instance, applying the query on a search engine to search a corpus of unstructured data. The search results are used and analyzed to define one or more hypotheses that are based on additional attributes of the instance. In some cases, a set of potential hypotheses are defined, and a subset thereof is selected to be utilized. In some exemplary embodiments, a subset of the unstructured data corpus comprising a plurality of unstructured data records may be obtained and utilized to derive a value of an attribute that is used as a basis for a hypothesis. Additionally, or alternatively, the value of the attribute may be derived from a single unstructured data record.

In some exemplary embodiments, the instance may comprise at least one attribute having a data type that can be searched, such as text, image, or the like. An attribute may be referred to as "searchable attribute" if it comprises information that can be fed to a search engine of an unstructured data corpus. In some exemplary embodiments, the searchable attribute may be searched using a web search engine. Additionally, or alternatively, the searchable attribute may be used to search indexed information obtained by a web crawler.

In some exemplary embodiments, an instance may be mapped to a searchable entity, based on a value of an attribute. For example, the attribute comprising a name of the company may be used (e.g., "Ford" or "General Motors"). In some exemplary embodiments, the mapping is based on a portion of the value of an attribute (e.g. a portion of the company name excluding LTD or INC suffix). A query is defined based on the searchable entity. The query may comprise the searchable entity (e.g., name of company). Additionally, or alternatively, the query may comprise additional keywords (e.g., the constant string "company", which may be provided manually by a user or otherwise defined), include search engine operators such as domain restrictor, file type restrictor, or the like. The query may be submitted to a search engine configured to search the unstructured data corpus. A subset of the results may be selected, such as by selecting top X results (e.g., top 30 GOOGLE™ results, 20 most recent results according to their timestamp, or the like). The search results may then be used to define values for potential attributes that are used as part of one or more hypotheses.

As an example, the search results may be pages accessible over the web, also referred to as web pages (e.g., HyperText Markup Language (HTML) pages, or pages of similar format, a Comma-Separated Values (CSV) file, an unformatted text file, a Portable Document Format). The text of the web pages may be indexed. In some exemplary embodiments, all texts may be indexed. Additionally, or alternatively, only texts in a portion of the document may be obtained, such as texts in relevant paragraphs. Relevant paragraphs may be, for example, defined as paragraphs which caused the web page to match the query (e.g., matching at least partially the query), paragraphs adjacent paragraphs which caused the web page to match the query, or the like. Additionally or alternatively, properties and metadata of the web page may be obtained and used, such as title text, modification time, document owner, or the like.

In some exemplary embodiments, the set of results may be expanded by following links, such as hyperlinks, in the content of results. As an example, links may be traversed to expand the set of results. In some cases, traversal may be limited to a predetermined distance. The distance metric may be based on the distance between the link itself and the matches of the query, so as to ensure links that are relevant to the query are traversed while ignoring non-relevant links appearing in the same page. In some cases, link traversal may be performed from traversed pages as well. In some cases, the distance metric may be based on a distance value for each additional link traversal, so as to limit the number of links traversed from the original result. In some cases, the distance metric may be a combination of the above, so as to allow deeper link traversal for links that are in immediate proximity to matched regions than links that are further away therefrom.

In some exemplary embodiments, properties of the results may be used to define the attributes. For example, how many results are found may be used to define an attribute (e.g., attribute of number of results); how recent the most recent result is may be used to define an attribute (e.g., timestamp of most recent result, keywords in recent result); whether a certain site/domain appears in the result may be used to define a Boolean attribute (e.g., entries from Wikipedia or from TitanicSurvivors site), whether the name of the instance appears in a document (e.g., does the name appear in a document of titanic survivors? Does the company name appear in the Fortune 500 list? Does the firm name appear in a ranking document?), or the like. In some exemplary embodiments, the text of the web pages may also be used to define an attribute. In some exemplary embodiments, the pages may be indexed and each word appearing in them may be identified and counted. The number of times the word appears in a page may be used as the attribute. For example, in the use case of classifying companies to their industries, whether a certain word like automotive or car appears in these pages may be an attribute. In the Titanic survival example, the attribute could be whether the phrase "survived" appears in the body or title of web pages retrieved for each passenger.

In some exemplary embodiments, a query may be defined based on a plurality of instances. The query may be aimed to find collective data relevant to many instances, such as lists, tables, dictionaries, or the like. The collective data may then be used to define attributes that are used in potential hypotheses.

A set of instances may be obtained. In case of supervised training, when the dataset is a labeled training dataset, instances having the same label may be joined together in order to define a query that is adapted to obtain collective data relevant to the label. Additionally, or alternatively, instances having different labels may be joined together to define a query that is useful in obtaining collective data which describes entities of different labels and potentially enables to distinguish therebetween. The instances that are used to define a query may be a proper subset of the instances in the labeled training dataset, such as a randomly selected sample thereof, frequency-based sample thereof, or the like. In some cases, the samples may be limited to a maximal size, such as a sample of no more than a predetermined threshold of instances. The threshold may be different for samples of instances sharing the same label, as opposed to instances having different labels.

Per each set of instances, a query may be defined, such as by concatenating the entity identifier feature (e.g., passenger's name; company's name) of each instance. For example, the query may comprise a list of names of companies of the same industry (e.g., "Ford, General Motors, Volkswagen"), a list of names of Titanic survivors, a list of names of Titanic victims, or the like. The query may include, in addition, keywords, restrictors, or the like. As an example, the query "Ford, General Motors, Volkswagen filetype: CSV" may be used to locate spreadsheet available in the corpus that contain many automotive companies.

The query may then be fed to a search engine configured to search the unstructured data corpus for relevant results. The results may be filtered, fetched, scraped and parsed. The content of the fetched results may be indexed, and used for creating attributes. In some exemplary embodiments, the potential attribute may be a relationship between an instance and the indexed content. For example, whether the entity of the instance appears, appears frequently enough (e.g., above a threshold), in the indexed collection. So, if the indexed collection is a list of all automotive companies, if the name of a company appears in the list, it is likely an automotive company. Such an inference can be made based on the name of the company alone, and although the company's name was not included in the training dataset. As another example, the list may be a list of Titanic survivors, and if the instance's identifier appears in the list, it may be useful to predict that the entity is a Titanic survivor. In some cases, the whether the entity appears near certain terms, appears in a high-ranked website, appears in a title of the website or other notable metadata field, appears in the first paragraph of the document, or the like, may also be used as a basis for a potential attribute.

Based on either or both above-mentioned methods, potential hypotheses may be determined, using the above attributes. Hypotheses may be selected from the potential hypothesis based on statistical measurement. In supervised learning setting, the training dataset is a labeled dataset. The potential hypotheses may be validated or refuted using the instances' labels. The potential hypotheses which exhibit a correlation between the potential feature and the label may be deemed as validated and used as hypotheses. Many potential hypothesis that are automatically generated may be discarded and ignored if they do not exemplify a statistical significant correlation to the label.

Yet another technical solution may be to provide for an automated hypothesis generalizer. An hypothesis may be extracted from a given problem. In particular, the hypothesis may be of the form: $f(x)$ contains w, where x is a data input (e.g., text or another collection of searchable entities), w is a word or another searchable entity, and $f$ is a function. As an example, the hypothesis may be "company-description contains dollar", where company-description is a value of an instance x in an attribute "description". Such an hypothesis may be validated if the value correlates with the label. In addition, additional hypotheses, such as "company-description contains pound" and "company-description contains yuan" may also be included. The words, w, may be grouped based on the label. Additionally, or alternatively, the words may be grouped by the function $f$ itself. A query may be derived based on the words that are grouped together. In the above-mentioned example, the query may be based on "dollar, pound, yuan". The query may be, for example, "dollar, pound, yuan filetype:csv", which may likely yield tables of currencies. Based on such result, potential hypothesis using different words w may be defined. For example, "company-description contains euro" may be automatically generated as a potential hypothesis, although the training dataset may not have included a single example, where the euro currency is mentioned. Such a solution may also be useful to include information regarding currencies that were seen in the training set, but in limited manner and without a sufficient number of examples from which a deduction may be derived.

In some exemplary embodiments, the disclosed subject matter may enable obtaining a sample of the instances and deduce a hypothesis therefrom, such as by identifying text strings that are correlative in by themselves. From m instance-based hypothesizes for the same label, a query may be generated and a sub corpus is obtained to be used for the creation of the potential hypothesis that is based on the unstructured data corpus.

In some exemplary embodiments, in order to reduce the number of overall features in a machine learning model, not all new potential hypotheses are encoded into features. Instead, the hypotheses may be examined to select only a subset thereof. The hypotheses of interest may be selected from the potential hypotheses using a statistical metric, such as entropy, correlation, chi-squared test, or the like.

It will be noted that the disclosed subject matter is not limited to supervised learning only, and may be applied on unsupervised or semi-supervised methods as well.

One technical effect of the disclosed subject matter is to enrich the dataset used in machine learning and big data analysis using unstructured data corpus. In some cases, the disclosed subject matter may harness search technology to be used in big data and machine learning technologies. Search engines are useful tools for human beings, currently and before the disclosed subject matter, they were not utilized in any manner in big data and machine learning technologies, as they involved unstructured data that could not be used in this context. The disclosed subject matter enables the use of the unstructured data in these technologies and therefore gains the benefit of improved searching technologies as well.

Another technical effect is to enable automated hypotheses generation based on unstructured data corpus. The hypothesis may be used as part of a machine learning model, to provide improved prediction and classification capabilities. In supervised learning, the disclosed subject matter may out-perform other techniques, without requiring enlarging the number of instances in the training dataset. The hypothesis may be used in big data analysis to derive insights about entities and instances, even when the label itself need not be predicted. The automated insights may provide information that is not available in the training dataset itself, but which may be of business value. Hence, the disclosed subject matter is capable of data mining the WWW and other unstructured data corpuses, and to automatically identify information and insights that may have substantial business value.

Another technical effect is to enable improved prediction based on enormous unstructured data corpus, such as the WWW. The WWW is a source of almost infinite knowledge, constantly growing and improving. The data available therein may be used to identify relevant subsets of data that can be used for the purpose of the specific machine learning or big data analysis at hand. Enabling prediction of a passenger being a survivor although the passenger was not included in the training set, and based solely on his name, appears impossible at first hand, but using the disclosed subject matter, the available data from the WWW is leveraged to create auxiliary data that is richer than the training dataset itself, and enables improved prediction for new and unseen instances.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1A showing a flowchart diagram of a method, in accordance with some exemplary embodiments of the subject matter.

On Step 110, a labeled dataset may be obtained. The labeled dataset may comprise instances representing entities. Each instance may be paired with a label. For example, each instance may represent a Titanic passenger, and the label may represent whether the passenger is a survivor or a victim. The labeled dataset may be a training dataset used in supervised learning. In some exemplary embodiments, the labeled dataset may be the outcome of merging information obtained from a plurality of data sources. In some cases, an instance may be represented by multiple records in multiple tables. In some cases, the records may be merged to provide all attributes of the instance. In some cases, the label of the instance may be obtained from one data source, while some of the attributes may be obtained from another data source, where the instance has no paired label.

On Step 120, an entity identifier is extracted for each instance of the dataset. The entity identifier may be a searchable attribute or portion thereof. The entity identifier may, for example, a picture of the passenger, a name of the passenger, and ID number of the passenger, or the like. In the exemplary embodiment of FIG. 1, feature j of the record is the entity identifier. The value of feature j for record i is denoted $M_{ij}$. The entity identifier is denoted as $E_{ij}$. $E_{ij}$ may be obtainable from $M_{ij}$.

On Step 130, for each instance, a query may be generated based on the entity identifier. The query for entity $E_{ij}$ is denoted as $Q_{ij}$. $Q_{ij}$ may comprise $E_{ij}$. $Q_{ij}$ may further comprise search engine operators, such as file type restrictors. $Q_{ij}$ may be configured to search spreadsheets, such Comma-Separated Values (CSV), Excel Binary File Format (XLS), or the like. Additionally or alternatively, $Q_{ij}$ may be created based on user-input, such as user-provided keywords. $Q_{ij}$ may be configured to search the WWW. $Q_{ij}$ may be restricted to search only specific domains, thereby restricting the data available thereto via the WWW. For example, $Q_{ij}$ may include a restriction requiring the search retrieve pages from wikipedia.org domain, finance.yahoo.com domain, or the like. In some exemplary embodiments, $Q_{ij}$ may further comprise a keyword representing the type of entity. For example, the name of the passenger may be included in addition to the keyword "passenger", "Titanic", "Titanic passenger" or the like. The keyword may be obtained from the metadata representing the instance. Additionally or alternatively, the keyword may be provided by a user. Additionally, or alternatively, $Q_{ij}$ may further comprise the label. For example, in case the passenger is a survivor, the word "survivor" may be added.

It will be noted that the query may be enhanced using dictionaries, to refer also to synonyms, to catch typos, or the like. However, as modern search engines include such features inherently, a simple query may be generated and the abilities of search engine may be harnessed to provide the best possible matches for a given search query.

On Step 140, the query $Q_{ij}$ may be provided to a search engine for execution. The search engine may apply the query and return search results, denoted as $R_{ij}$. The results may be mapped to the entity $E_{ij}$. In some exemplary embodiments, $R_{ij}$ may be a subset of the results, such as a subset of a predetermined size (e.g., about 10 results, about 20 results, about 30 results, or the like). The subset $R_{ij}$ may be selected based on any scoring metric, such as but not limited to relevancy metric, text similarity, reference-based score, freshness, combination thereof, or the like. In some exemplary embodiments, the search engine may search any corpus of unstructured data, such as the Internet, an intranet, a local repository, or the like. Any data source may be utilized, and the WWW is merely an example of such corpus of unstructured data.

On Step 150, auxiliary data of the $R_{ij}$ may be fetched from the corpus. As an example, if the query is sent to a web search engine, the web pages correlating to the results (e.g., the results indicate Uniform Resource Locator (URL) of the pages, as listed in a results page returned by the search engine) may be fetched from the WWW. In some exemplary embodiments, the fetched auxiliary data may be filtered to remove non-relevant data, such as paragraphs that are not relevant to the search query $Q_{ij}$, paragraphs that are not in proximity (e.g., a distance of less than a threshold from) paragraphs that are relevant to the search query $Q_{ij}$, or the like.

On Step 160, the auxiliary data may be processed. In some exemplary embodiments, the auxiliary data may be indexed to generate a set of words that appear in the auxiliary data. Additionally, or alternatively, the auxiliary data may be indexed to generate a mapping of words appearing in the auxiliary data and their count. Each indication of a word appearing in the auxiliary may be considered as an attribute, such as of a Boolean value, which may be used as a basis of a potential hypothesis. The value may be "TRUE" for each word appearing in the auxiliary data, and "FALSE" for each word not appearing. The potential feature may have an integer value, where the value is a number of times the word appears. It will be noted that words appearing for a first entity may not appear for a second entity. The new attributes determined for the first entity may be computed for the second entity as well.

During the processing of the auxiliary data, the content of the auxiliary data may be processed. Additionally, or alternatively, an address of the auxiliary data, such as the URL, may also be processed. In some exemplary embodiments, a domain of the auxiliary data may also be identified and noted as an attribute which can be used as a basis for a hypothesis. For example, if a company's name appears on a web page in the PC Magazine website, it can be deduced that it is related to the hi-tech sector.

On Step 170, for each instance, attributes corresponding properties of the results may be identified. For example, how many or how recent results are found, whether a certain site or domain appears in the result $R_{ij}$. As another example, the attribute could be whether the phrase "survived" appears in the body or title of the web page retrieved for the passenger $E_{ij}$. As yet another example, whether the word "automotive" or "car" appears in relation to a company and how often, may be indicative of the company being or not being in the automotive industry.

On Step 180, based on the attributes identified and computed, hypothesis generation may be employed to generate a hypothesis. The hypothesis generating may comprise validating or refuting potential hypotheses that are based on the new attributes identified on Step 170. A potential hypothesis that is based, at least in part, on a new attribute identified on Step 170, may be obtained, and labels of a training dataset may be utilized to validate or refute it. A proper subset of the potential hypotheses may be selected based on a statistical metric, such as but not limited to statistical correlation, statistical entropy, chi-squared test, or the like. In some cases, new attributes that are not used by any validated hypothesis may be ignored. In some exemplary embodiments, a hypothesis may be validated even if it does not hold for all instances. The validation may be a statistical validation.

On Step 190*a*, a predictive model may be trained using the newly generated hypothesis. The training may be based on the training dataset to which the new attributes are added. Additionally, or alternatively, on Step 190*b*, insights may be derived using the newly generated hypothesis. The insights may be outputted to a user to be used by a user even without the use of a predictive model.

In some exemplary embodiments, it may not be known which attribute represents the entity identifier. So, the disclosed subject matter may be performed iteratively with all possible attributes j. Potential hypotheses may be generated based on each attribute, to provide a larger variety of potential hypotheses for validation. As a result, no a-priori knowledge of the nature of the dataset may be required, and the information is deferred automatically.

Figure 1B:
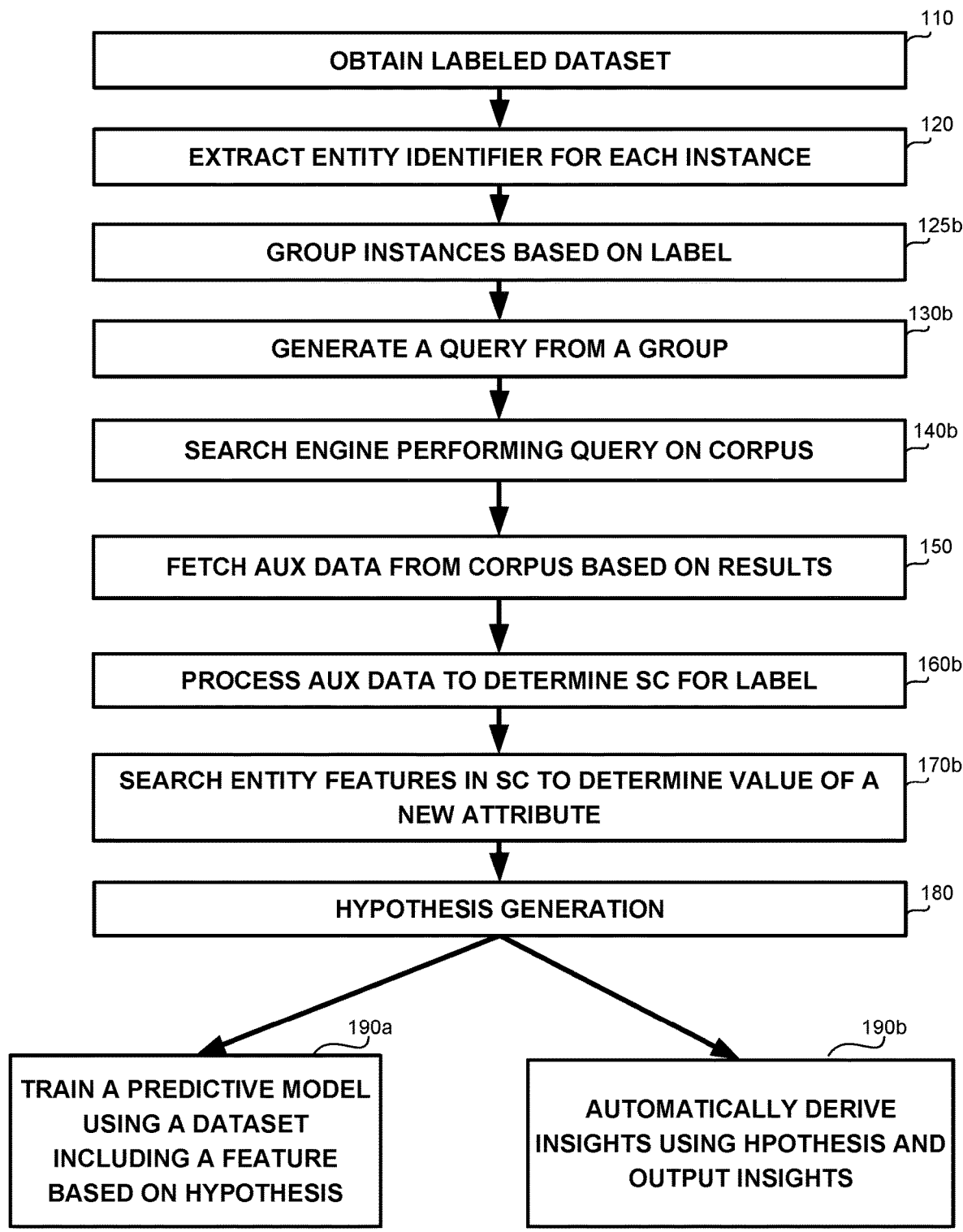

Referring now to FIG. 1B showing a flowchart diagram of a method, in accordance with some exemplary embodiments of the subject matter.

Following Steps 110, 120, Step 125*b* is performed. On Step 125*b*, entities may be selected and grouped based on the entities sharing a same label l. In some exemplary embodiments, the group may be limited in size, such as up to a predetermined maximal threshold of about 5 entities, about 10 entities, or the like. Additionally, or alternatively, if the number of entities matching label l exceeds the threshold, the entities may be selected based on a selection criteria, such as alphabetically, based on similarity measurements, randomly, or the like. The group of entities may comprise two or more entities. The group of entities corresponding label l may be denoted as $G_l$.

On Step 130*b*, a query may be generated based on the group of entities. The query corresponding label l may be denoted $Q_l$. It will be noted that as in FIG. 1A, if the entity identifier is unknown, the process may be performed for each attribute j (or set thereof) having the potential of comprising the identifier, and the query may be denoted $Q_{lj}$. However, for simplicity of the disclosure, we disregard the different attribute j.

$Q_l$ may comprise the identifiers of the entities of $G_l$. In some exemplary embodiments, $Q_l$ may concatenate the entity identifiers. Additionally, or alternatively, $Q_l$ may be generated to include additional search engine operators, keywords, or the like, in a similar manner to that described above with relation to Step 130. As an example, $Q_l$ may be "Ford, General Motors, Volkswagen filetype:CSV", comprising three entity identifiers and a search engine operator.

On Step 140*b*, similarly to Step 140, query $Q_l$ may be fed to a search engine to be performed. Search results are retrieved accordingly (150).

On Step 160*b*, the results may be processed, similarly to Step 160. An indexed collection $SC_l$ may be determined for label l.

On Step 170*b*, per each instance i having label l, the attributes of the entity $E_{ij}$ and $SC_l$ may be searched. In some exemplary embodiments, the content of $SC_l$ may be searched for to identify whether $E_{ij}$ is comprised therein. Based on the search results, a value of a new attribute is determined. Based on the new attribute, a potential hypothesis may be defined. For example, the hypothesis may be that different values of the new attribute are indicative of different labels for the instance.

It will be noted that more than a single query can be generated and performed for each label l. In some exemplary embodiments, n different queries may be generated for label l: $Q^1_l, Q^2_l, Q^n_l$. Each query $Q^k_l$ may be based on about m entities having the label l.

Figure 1C:
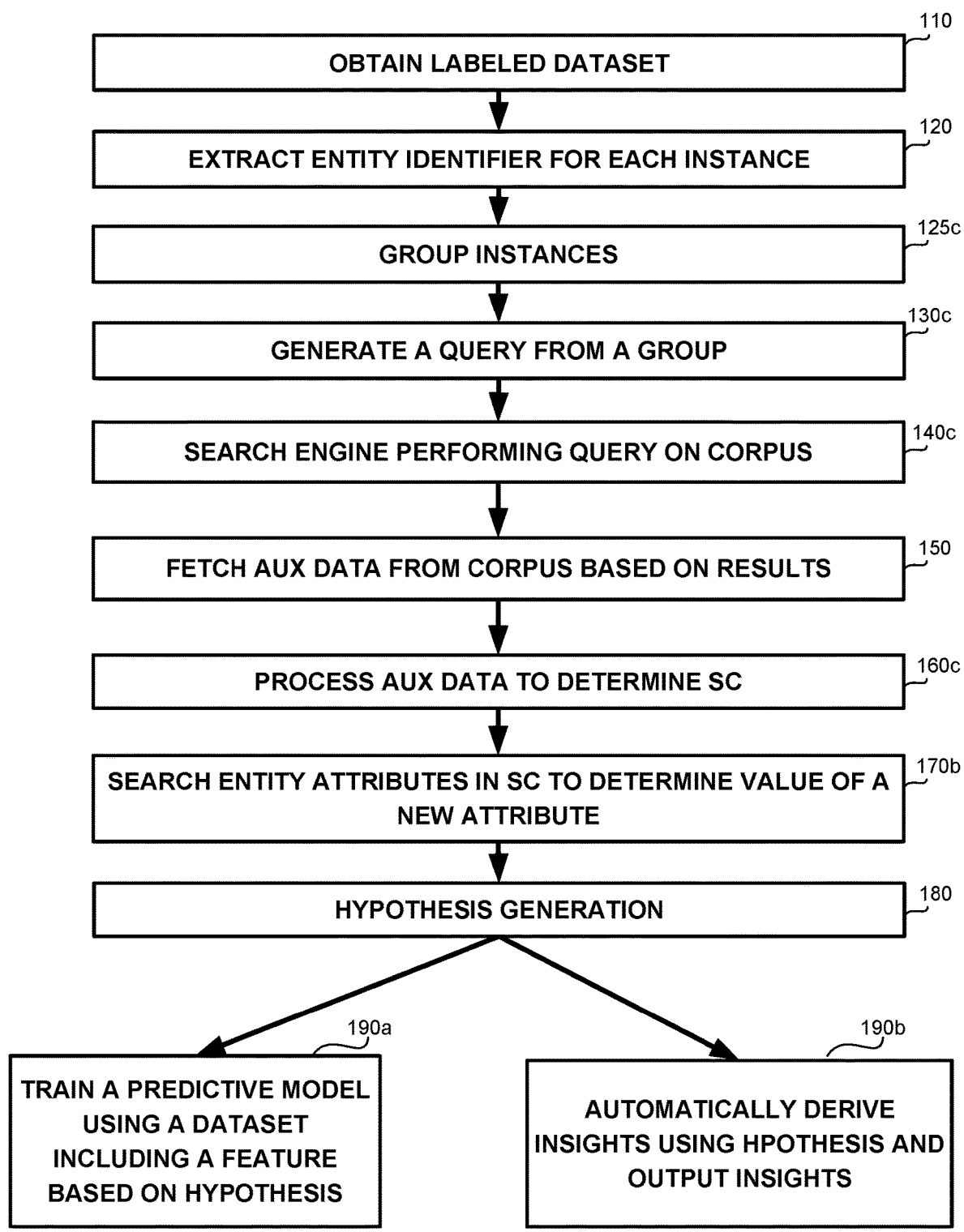

Referring now to FIG. 1C showing a flowchart diagram of a method, in accordance with some exemplary embodiments of the subject matter. In FIG. 2B, Step 125*c*, the entities are selected grouped not based on having a common label. On Step 125*c*, entities having different labels are grouped together, representing a sample of the different potential entities. Steps 130*c*, 140*c* correspond Steps 130*b*, 140*b*, but the queries they relate to are not associated with a label. Similarly, Step 160*c* which is similar to Step 160*b*, determines a collection SC that is not associated to a specific label. The relation between SC and $E_{ij}$ are determined to extract a value for new attributes. Based thereon one or more hypotheses may be generated (Step 180). Some relationships between the instances and the fetched and processed auxiliary data (e.g., SC) can be used as the basis of the hypothesis. In some exemplary embodiments, the new attributes that are associated with validated hypotheses may be used to encode features in the prediction model and can be used to estimate the label. Additionally or alternatively, the hypothesis may be used to output insights to users.

Figure 2:
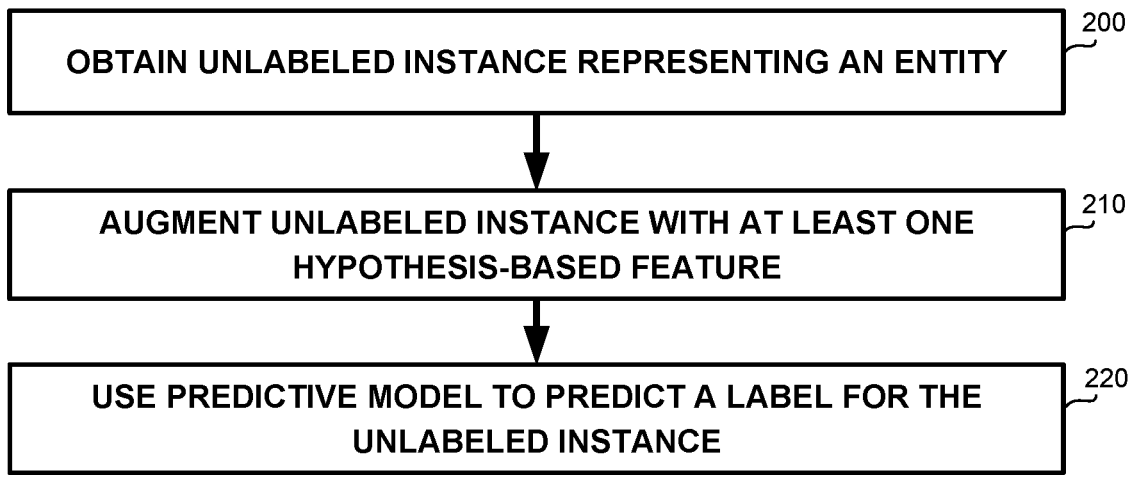
FIG. 2 shows a flowchart diagram of a method, in accordance with some exemplary embodiments of the disclosed subject matter.

Referring now to FIG. 2, showing a flowchart diagram of a method, in accordance with some exemplary embodiments of the subject matter.

On Step 200, an instance is obtained. The instance may be unlabeled. The unlabeled instance may represent an entity, also referred to as the entity of interest. The unlabeled instance may be an instance similar to the labeled instance of the labeled dataset, but without having a known label. It may be desired to predict a label for the unlabeled instance.

On Step 210, the instance is augmented with values to the new attributes that are the basis of generated hypotheses, which were generated on Step 180 of any of FIGS. 1A-1C. The values of the new attributes may be determined based on the relationship between the entity of interest and the collection SC, the collections $SC_j$, or the like. Additionally or alternatively, the values may be determined by first generating a query as is described above with respect to Step 130, performing the query as is described above with respect to Step 140, and processing the results as is described above with respect to Steps 160-170. Hence, the value of the new attribute may be determined based on a new query generated and processed for the unlabeled instance. Additionally or alternatively, the value of the new attribute may be determined without generating and processing a new query, but rather relying on auxiliary data that was obtained in the training phase, by a search engine searching the unstructured data corpus.

On Step 220, a predicative model which was trained in view of the labeled dataset (e.g., on Step 190a) may be consulted to predict a label for the unlabeled instance. The prediction may be performed using a modified instance which includes the attributes in the unlabeled instance and the new attributes whose value is computed based on the unstructured data (which is either retrieved for the unlabeled record directly, or was retrieved previously and retained (e.g., SC)).

In some exemplary embodiments, the auxiliary dataset utilized in the method of FIG. 2 may be the same as the auxiliary dataset used in the method of FIG. 1. Additionally, or alternatively, the auxiliary datasets may be similar datasets but having different content, such as dataset of different vendors, different corpus of unstructured data of similar vendors.

Figure 3:
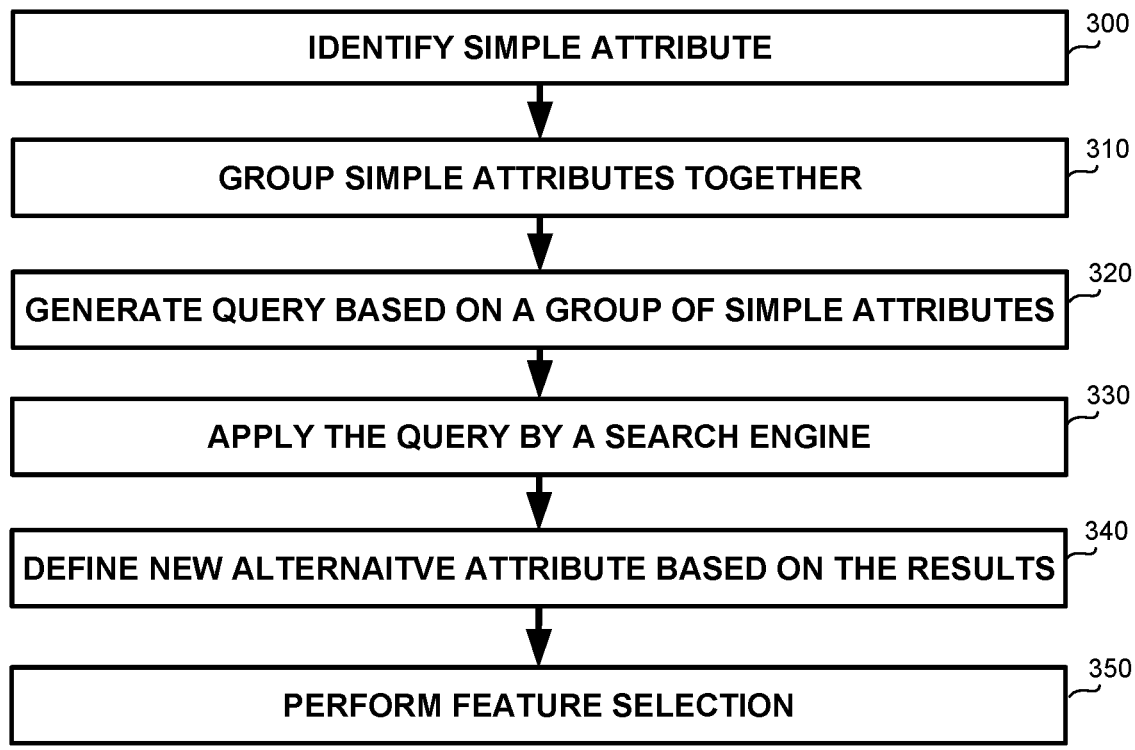
FIG. 3 shows a flowchart diagram of a method, in accordance with some exemplary embodiments of the disclosed subject matter.

Referring now to FIG. 3, showing a flowchart diagram of a method, in accordance with some exemplary embodiments of the subject matter.

On Step 300 a simple attribute may be identified from a machine learning problem. The simple attribute may be an attribute whose value is directly encoded in the instance and be the basis of a hypothesis. The attribute may be of the form $f(x)$ contains w. where x may be the entity or searchable identifier thereof, w may be a word or another searchable entity, and $f(x)$ is a function. As an example, the Boolean attribute may be company-description contains dollar, company-description contains pound, or the like. In some exemplary embodiments, the simple attributes are extracted from the dataset and comprise only those attributes whose values are statistically significant for the prediction of the label.

On Step 310, the simple attributes may be grouped. In some exemplary embodiments, all attributes of the same entity may be grouped together. For example, all simple attributes that are the basis for hypotheses of the form "the address of the entity comprises COUNTRY", where COUNTRY is a different country in each hypothesis (e.g., address of the entity comprises Italy; address of the entity comprises France; address of the entity comprises Germany; etc.) In some exemplary embodiments, attributes may be grouped together for the same instance, depending on their function $f$, so as features of $f(x)$ contains $w_1$, $f(x)$ contains $w_2$, ... $f(x)$ contains $w_n$ are grouped together in one group, while $g(x)$ contains $v_1$, $g(x)$ contains $v_2$, ... $g(x)$ contains $v_n$ are grouped together in a different group for the same entity. For example, $f(x)$ may be address of the entity, while $g(x)$ may be company description. As a result, attributes relating to the address of the entity may be grouped together, and those relating to the company description may be separately grouped. In some exemplary embodiments, grouping may be based on the value of the simple attributes (e.g., having the same Boolean value). In other embodiments, the grouping may be irrespective of the value of the simple attributes and of the entities themselves. In such an embodiment, the groups are determined for the entire dataset.

On Step 320, a query may be generated based on the grouped simple attributes. In some exemplary embodiments, the query Q may be generated by using the words $w_1 \ldots w_n$ appearing in the grouped attributes. Referring to the example above of currencies, each word may be a different currency, hence the query may be a list of currencies. Referring to the example of the addresses, each word is a different country, and the query is a list of countries. In some exemplary embodiments, the query Q may concatenate the words. Additionally, or alternatively, search engine operators may be utilized, such as restricting a type of result, a domain from which the result is obtained, a freshness of the result, or the like.

On Step 330, the results are fetched and on Step 340, the results may be analyzed to extract additional alternative words therefrom, which may be used to define alternative attributes, such as $f(x)$ contains $w'_1$, $f(x)$ contains $w'_2$, ..., $f(x)$ contains $w'_n$. Each group may be expanded based on the results from the query generated for the group. Referring to the example above, it may be determined that alternative countries to Italy, Germany and France are Belgium, Poland and other EU-countries. As a result, hypotheses referring to Belgium and to Poland may be generated.

On Step 350, feature selection may be performed, to select a feature for the machine learning model. Feature selection may be performed in view of statistical significance of the new attributes, so as to encode features based on new attributes representing hypotheses. In some cases, feature selection may be performed after viewing additional datasets, as the disclosed subject matter may be useful in expanding and generalizing the features, which are concrete examples thereof that appear in the initial training set. The above example, for instance, exemplifies that the appearance of a currency sign in the description of the company may be useful for predicting the label. However, only a subset of the currencies were included in the training dataset. The more generalized hypothesis may be a hypothesis that is based on $SF_1$ or $SF_2$ or ... or $SF_n$, where $SF_i$ is a simple attribute that was originally present or a simple attribute that was created based on the query. Hence, the concrete examples are used, using the unstructured data corpus, to determine and identify a more general attribute in an automatic manner.

Figure 4:
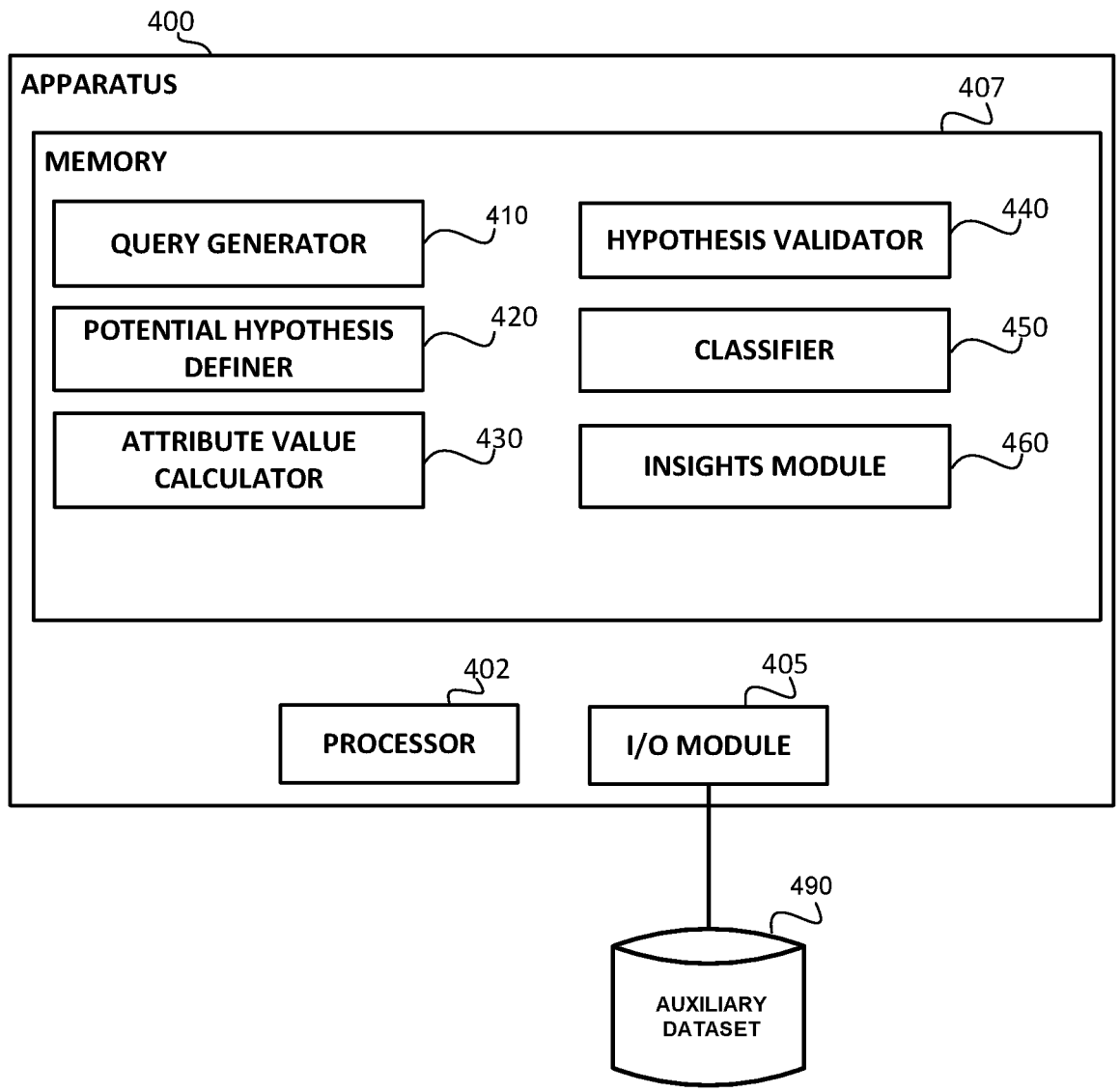
FIG. 4 shows a block diagram of an apparatus, in accordance with some exemplary embodiments of the disclosed subject matter.

Referring now to FIG. 4, showing a block diagram of an apparatus, in accordance with some exemplary embodiments of the disclosed subject matter. An Apparatus 400 may be configured to perform automated feature engineering using auxiliary dataset of unstructured data.

In some exemplary embodiments, Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide an output to and receive input from a user. For example, the user may be presented with a visual indication of insights, new attributes, or the like. Additionally, or alternatively, the user may provide rules, command and configurations used by Apparatus 400. Additionally, or alternatively, the user may review predictions provided by Apparatus 400.

In some exemplary embodiments, I/O Module 405 may be used to access an external data source, such as retaining Auxiliary Dataset 490, or other sources retaining unstructured data corpus. Auxiliary Dataset 490 may be searchable by a search engine that is configured to obtain a query and provide a subset of the corpus based thereon. The search engine may be configured to a-priori index the corpus, crawl the corpus on the fly, or the like. The search engine may be, for example, a web search engine, an image search engine, or the like.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400. Additionally, or alternatively, Memory 407 may retain a labeled dataset to be used for training.

Query Generator 410 may be configured to generate a query. The query may be generated based on a single entity, a group of entities, a group of simple features, or the like. The query may be configured to be used to identify a subset of the corpus retained in Auxiliary Dataset 490.

Potential Hypothesis Definer 420 may be configured to define potential hypotheses based on the subset of the corpus of unstructured data that is obtained in response to the query. The potential hypotheses may be based on new attributes whose value can be derived from Auxiliary Dataset 490, in view of relation of an entity or portion thereof with auxiliary data record, such as a list of Titanic survivors, or Fortune 500 companies. Potential Hypothesis Definer 420 may be configured to enumerate all possible potential hypotheses. Additionally, or alternatively, only a subset of the potential hypotheses may be defined by Potential Hypotheses Definer 420.

Attribute Value Calculator 430 may be configured to calculate a value for an attribute based on Auxiliary Dataset 490. Attribute Value Calculator 430 may be configured to utilize search results of queries generated by Query Generator 410 for an entity of interest in order to calculate the value of a new attribute for the entity.

Hypothesis Validator 440 may be configured to validate or refute potential hypotheses generated by Potential Hypothesis Definer 420. Validation may be based on utilizing a labeled dataset to determine statistical significance of the correlation between values of new attributes and the label. A proper subset of the potential hypotheses may be validated, while the remainder may be refuted.

Classifier 450 may be configured to predict, using a predictive model, a label for an instance. The predictive model may be trained using a training dataset that is modified using Auxiliary Dataset 490 to include new attributes that the basis of hypotheses validated by Hypothesis Validator 440. Additionally, or alternatively, Classifier 450 may be applied on an unlabeled instance that is modified using Auxiliary Dataset 490. An unlabeled instance may be modified by utilizing Query Generator 410 for the entity represented by the unlabeled instance, and using the subset of the Auxiliary Dataset 490 to compute the values for new attributes, such as using Attribute Value Calculator 430. Additionally, or alternatively, the unlabeled instance may be modified using a pre-fetched subset of the corpus, such as pre-fetched collection (e.g., SC).

Insights Module 460 may be configured to derive insights based on the hypothesis. The insights may be presented to a user in a graphical manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium retaining program instructions, which program instructions when read by a processor, cause the processor to perform a method comprising:

obtaining a labeled dataset from a plurality of data sources, wherein the labeled dataset comprises a plurality of instances, each instance in the labeled dataset comprising one or more attributes and representing an entity having an associated entity identifier;

for each instance in the labeled dataset:
extracting the entity identifier of the entity represented by the instance;
automatically and without user intervention generating a query based on the entity identifier of the instance, wherein the query is associated with a single instance in the labeled dataset;
providing the query of the instance to a search engine, wherein the search engine is configured to provide one or more results from an indexed unstructured data corpus that match the query, wherein the indexed unstructured data corpus is different from the labeled dataset, and wherein the query is restricted to search within entities of specific types, or the query has a concatenated domain restrictor, wherein the domain restrictor is a search engine operator configured to limit a domain from the unstructured data corpus from which results of the query are obtained; and obtaining the one or more results for the query of the instance from the search engine, invoking the search engine to perform an additional search for each instance in the labeled dataset and obtain additional auxiliary data for each instance in the labeled dataset, automatically determining a hypothesis for the dataset, wherein the hypothesis is based on a new attribute of an unlabeled instance to be analyzed, wherein the value of the new attribute of the unlabeled instance is determined automatically and without user intervention by generating a new query based on an entity identifier that is extracted from the unlabeled instance and retrieving search results of the search engine in response to the new query; and outputting an output, wherein the output is based on the hypothesis, wherein the output comprises at least one of:

an estimated label of the unlabeled entity, wherein the estimated label is determined based on the hypothesis; and an insight regarding a correlation of a value of one or more attributes with a label for entities in the labeled dataset, wherein the correlation is determined based on the hypothesis.

2. The computer program product of claim 1, wherein the hypothesis is that the search results of the search engine in response to the new query comprise at least one result that comprises a term, wherein the new attribute is indicative of an existence of a result that comprises the term in the search results of the search engine in response to the new query.

3. The computer program product of claim 1, wherein said automatically determining the hypothesis comprises:

determining one or more potential hypotheses, wherein each of the one or more potential hypotheses is based on a different new attribute whose value is based on at least a portion of the indexed unstructured data corpus; and for each of the potential hypotheses, validating or refuting the potential hypothesis based on the labeled dataset, whereby determining the hypothesis by identifying a potential hypothesis that is validated.

4. The computer program product of claim 1, wherein said generating the query comprises concatenating a file type restrictor, wherein the file type restrictor is a search engine operator configured to limit a type of unstructured data that can match the query based on a specific file type.

5. The computer program product of claim 1, wherein said obtaining the one or more results comprises obtaining, from the search engine, a results page comprising one or more lists of links to the one or more results; and traversing the links of the one or more lists of links to obtain the one or more results.

6. An apparatus comprising a processor and a memory, wherein said memory retaining the computer program product of claim 1.

7. The computer program product of claim 1, wherein the search engine is a web search engine, wherein the indexed unstructured data corpus is obtained by a web crawler fetching data from different websites associated with different domain names, wherein said generating the query comprises concatenating a domain name restrictor, wherein the domain name restrictor is a search engine operator configured to limit a domain name of a site from which results of the query are obtained.

8. The computer program product of claim 1, wherein said generating the query comprises concatenating a keyword, wherein the keyword is obtained from metadata representing the each instance.

9. The computer program product of claim 1, wherein said outputting comprises:

training a predictive model to label unlabeled instances using the hypothesis, wherein said training is performed with respect to the new attribute;

obtaining the unlabeled instance for label estimation;

extracting the entity identifier from the unlabeled instance;

generating the new query based on the entity identifier of the unlabeled instance;

retrieving the search results of the search engine in response to the new query;

augmenting the unlabeled instance with a value of the new attribute, wherein the value of the new attribute for the unlabeled instance is determined based on the search results of the search engine in response to the new query, whereby obtaining an augmented unlabeled instance;

applying the predictive model on the augmented unlabeled instance to estimate the estimated label of the unlabeled instance; and outputting the estimated label.

10. A method comprising:

obtaining a labeled dataset from a plurality of data sources, wherein the labeled dataset comprises a plurality of instances, each instance in the labeled dataset comprising one or more attributes and representing an entity having an associated entity identifier;

for each instance in the labeled dataset:

extracting the entity identifier of the entity represented by the instance;

automatically and without user intervention generating a query based on the entity identifier of the instance, wherein the query is associated with a single instance in the labeled dataset;

providing the query of the instance to a search engine, wherein the search engine is configured to provide one or more results from an indexed unstructured data corpus that match the query, wherein the indexed unstructured data corpus is different from the labeled dataset, and wherein the query is restricted to search within entities of specific types, or the query has a concatenated domain restrictor, wherein the domain restrictor is a search engine operator configured to limit a domain from the unstructured data corpus from which results of the query are obtained;

obtaining the one or more results for the query of the instance from the search engine;

invoking the search engine to perform a different search for each instance in the labeled dataset and obtain potentially different auxiliary data for each instance in the labeled dataset, automatically determining a hypothesis for the dataset, wherein the hypothesis is based on a new attribute of an unlabeled instance to be analyzed, wherein the value of the new attribute of the unlabeled instance is determined automatically and without user intervention by generating a new query based on an entity identifier that is extracted from the unlabeled instance and retrieving search results of the search engine in response to the new query; and outputting an output, wherein the output is based on the hypothesis, wherein the output comprises at least one of:
- an estimated label of the unlabeled entity, wherein the estimated label is determined based on the hypothesis; and
- an insight regarding a correlation of a value of one or more attributes with a label for entities in the labeled dataset, wherein the correlation is determined based on the hypothesis.

11. The method of claim 10, wherein the hypothesis is that the search results of the search engine in response to the new query comprise at least one result that comprises a term, wherein the new attribute is indicative of an existence of a result that comprises the term in the search results of the search engine in response to the new query.

12. The method of claim 10, further comprising:
encoding features for the labeled instances of the labeled dataset, wherein the encoded features comprise at least one feature encoded based on the new attribute;
training a predictive model using the encoded features of the labeled dataset;
obtaining the unlabeled instance;
encoding features for the unlabeled instance, wherein the encoded features comprise the at least one feature encoded based on the new attribute, wherein said encoding features for the unlabeled instance comprises:
generating a second query based on the unlabeled instance;
providing the second query to the search engine;
obtaining from the search engine, at least one result that matches the second query; and
determining a value for the new attribute for the unlabeled instance, based on the at least one result; and applying the predictive model on the encoded features of the unlabeled instance to predict a label thereof.

13. The method of claim 10, further comprising:
encoding features for the labeled instances of the labeled dataset, wherein the encoded features comprise at least one feature encoded based on the new attribute;
training a predictive model using the encoded features of the labeled dataset;
obtaining the unlabeled instance;
determining a value for the new attribute for the unlabeled instance based on the one or more results of the query, whereby determining the value for the new attribute for the unlabeled instance without an invocation of the search engine and based on search result of the query which was performed a-priori; and
applying the predictive model on the encoded features of the unlabeled instance to predict a label thereof.

14. The method of claim 10, wherein the search engine is a web search engine, and wherein the indexed unstructured data corpus is obtained from the World Wide Web (WWW) using a web crawler.

15. The method of claim 10, wherein said generating a query, said providing the query, said obtaining the results, and said determining a hypothesis are performed iteratively for each of the one or more attributes.

16. The method of claim 10, wherein said generating a query, said providing the query, and said obtaining the results are performed iteratively for each of the one or more attributes.

* * * * *